US006901624B2

(12) United States Patent
Mori et al.

(10) Patent No.: US 6,901,624 B2
(45) Date of Patent: Jun. 7, 2005

(54) SELF-MOVING CLEANER

(75) Inventors: Hiroshi Mori, Shiga (JP); Kiminori Kato, Shiga (JP); Naoyuki Ohara, Shiga (JP); Toru Odachi, Shiga (JP); Hidetaka Yabuuchi, Hyogo (JP); Hiroyuki Kayama, Osaka (JP); Miki Yasuno, Osaka (JP); Masayo Haji, Hyogo (JP); Tadashi Matsuyo, Shiga (JP); Hidetoshi Imai, Shiga (JP); Yasuo Oshima, Shiga (JP); Masaichi Fukushima, Shiga (JP); Atsushi Nakayama, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 410 days.

(21) Appl. No.: 10/160,015

(22) Filed: Jun. 4, 2002

(65) Prior Publication Data

US 2002/0189045 A1 Dec. 19, 2002

(30) Foreign Application Priority Data

Jun. 5, 2001 (JP) .................................... 2001-169239
Jun. 5, 2001 (JP) .................................... 2001-169244

(51) Int. Cl.[7] .............................. E01H 1/08; A47L 5/00
(52) U.S. Cl. ........................................ 15/319; 700/245
(58) Field of Search ................... 15/319, 339; 700/245

(56) References Cited

U.S. PATENT DOCUMENTS

| 4,700,427 A | * 10/1987 | Knepper ....................... 15/319 |
| 4,967,064 A | 10/1990 | Field et al. |
| 5,109,566 A | 5/1992 | Kobayashi et al. |
| 5,341,540 A | * 8/1994 | Soupert et al. ................ 15/319 |
| 5,369,347 A | * 11/1994 | Yoo ....................... 318/568.12 |
| 5,548,511 A | * 8/1996 | Bancroft ....................... 701/23 |
| 5,568,589 A | * 10/1996 | Hwang .......................... 706/52 |
| 5,720,077 A | * 2/1998 | Nakamura et al. .......... 15/340.1 |
| 5,815,880 A | * 10/1998 | Nakanishi ..................... 15/319 |
| 5,940,927 A | * 8/1999 | Haegermarck et al. ........ 15/319 |
| 6,124,694 A | * 9/2000 | Bancroft et al. ............. 318/587 |
| 6,370,453 B2 | * 4/2002 | Sommer ....................... 701/23 |
| 6,481,515 B1 | * 11/2002 | Kirkpatrick et al. ........ 180/65.1 |
| 6,574,536 B1 | * 6/2003 | Kawagoe et al. ............. 701/23 |
| 6,594,844 B2 | * 7/2003 | Jones .......................... 15/49.1 |

FOREIGN PATENT DOCUMENTS

| FR | 2 686 167 | 7/1993 |
| GB | 2344748 | * 6/2000 |
| GB | 2 350 696 | 12/2000 |
| JP | 7-005921 | 1/1995 |
| WO | 93/03399 | 2/1993 |
| WO | 01/41621 | 6/2001 |

* cited by examiner

Primary Examiner—Terrence R. Till
(74) Attorney, Agent, or Firm—Wenderoth, Lind & Ponack, L.L.P.

(57) ABSTRACT

A self-moving cleaner has a main body and comprises an intake opening for suctioning dust, an electric blower for generating airflow to suction dust, a dust receiver for collecting the dust suctioned by the electric blower, rollers driven by drive motors, a power source for supplying electric power to the electric blower and the drive motors, and sensors for optically detecting a distance to an obstacle. An enclosure surrounds the main body, the electric blower, the dust receiver, the power source, and the sensors, wherein the enclosure is transparent or semi-transparent, and the sensors transmit and receive light through the enclosure.

9 Claims, 9 Drawing Sheets

SELF-MOVING CLEANER

FIELD OF THE INVENTION

The present invention relates to a self-moving cleaner having a main body with a self-moving function for automatically cleaning a surface to be cleaned.

BACKGROUND OF THE INVENTION

A self-moving cleaner hitherto known is provided with a moving device for moving a main body, a direction sensor for detecting a moving direction of the main body, a distance sensor for measuring a distance to an obstacle around the main body, a control device for controlling the moving device according to the direction sensor and the distance sensor, an electric blower for suctioning dust from a floor surface, and a battery serving as a power source for supplying electric power to the moving device and the electric blower, wherein the cleaner first travels alongside walls, and then travels in an inner area under control of the direction sensor. It has been common practice to place detectable objects such as reflecting plates, markers, magnets that produce magnetism, antennas that generate radio waves, and the like on walls of a room, in order to allow the cleaner to recognize predetermined locations by detecting these objects with sensors mounted to the main body. Otherwise, there has been a problem of requiring a complicated process for the cleaner to accurately detect a position of its own main body based on a moving direction and a distance of travel.

Besides, the main body is covered with an enclosure, which generally is opaque. There has therefore been another problem in which parts of the enclosure where light (i.e. infrared rays) pass through need to be transparent in order for a plurality of sensors to transmit and receive the light (infrared rays) to detect a distance, thereby making the enclosure complex in structure and increased in terms of cost.

SUMMARY OF THE INVENTION

A self-moving cleaner of this invention has: a main body; an intake opening for suctioning dust covering a surface being cleaned; an electric blower for generating airflow to suction the dust; a dust receiver for collecting the dust suctioned by the electric blower; a roller defining a moving device to be driven by a drive motor; a power source for supplying electric power to the electric blower and the drive motor; a sensor for optically detecting a distance to an obstacle, a heat source, and the like; and an enclosure containing the electric blower, the dust receiver, the power source, and the sensor, wherein the enclosure is transparent or semi-transparent, and the sensor transmits and receives light through the enclosure.

DETAILED DESCRIPTION OF THE PREFERRED EMBODIMENTS

A first exemplary embodiment will be described hereinafter with reference to FIG. 1 through FIG. 4.

Figure 1:
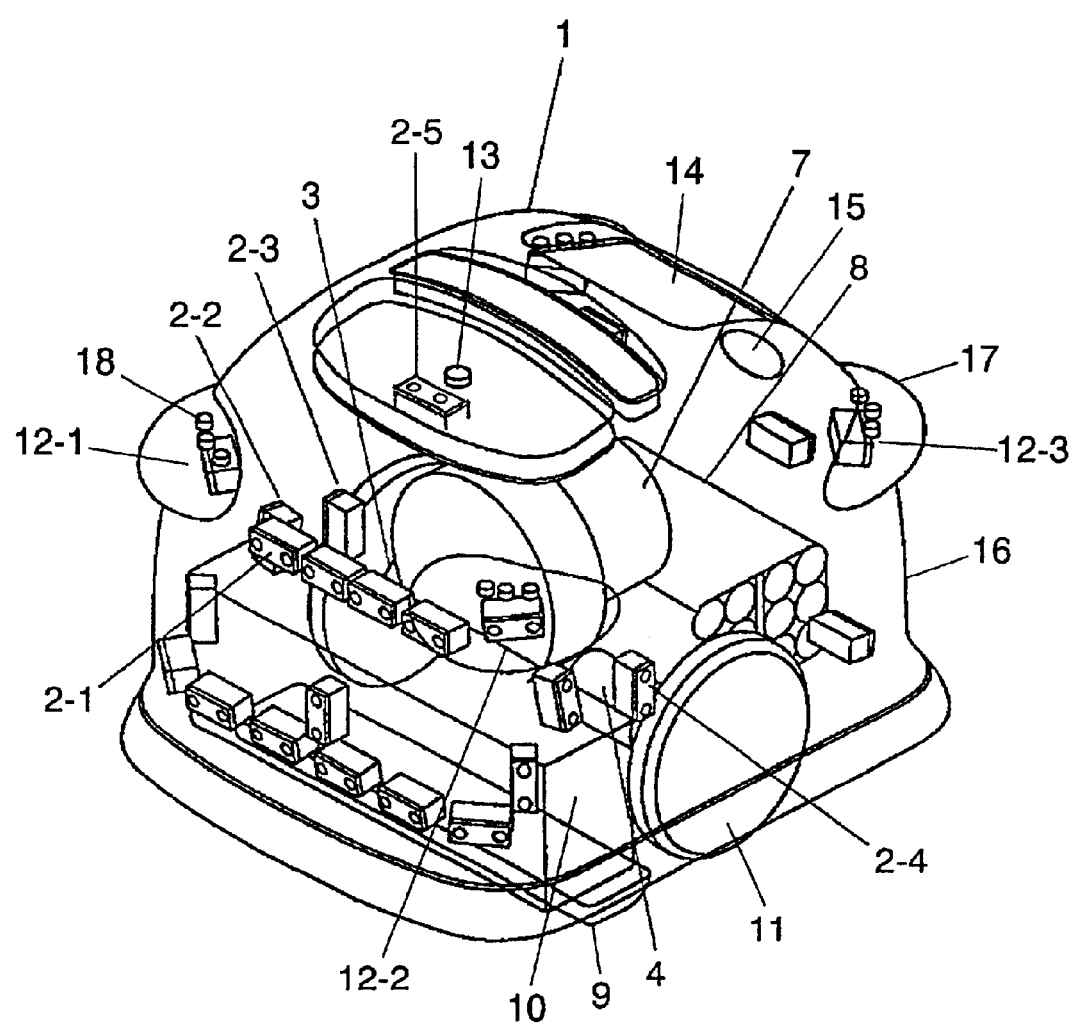
FIG. 1 is a perspective view of a self-moving cleaner representing a first exemplary embodiment of the present invention.

In FIG. 1, main body 1 is provided with intake opening 9 in a bottom forward section thereof, and so constructed that it suctions dust covering a surface being cleaned through the intake opening 9. Electric blower 7 generates airflow to suction the dust, and the electric blower is in communication with the intake opening 9 through dust receiver 10 in such a manner that the dust suctioned by the electric blower 7 from the intake opening 9 is collected into the dust receiver 10.

A power source comprises battery 8 consisting of a plurality of rechargeable secondary batteries, and it supplies electric power to the electric blower 7 and drive motors, which will be described later. Distance sensors 2-1, 2-2, 2-3, 2-4 emits light (i.e. infrared ray), and measures a distance according to an angle between this emitted light and reflected light returned from an obstacle such as home furniture. The distance sensors 2-1, 2-2, 2-3, 2-4 are mounted to a forward section, sides, and a rear section of the main body 1. Level sensor 12-1, 12-2, 12-3 detects a difference in a level of the surface (i.e. floor surface) to be cleaned. The level sensors 12-1, 12-2, 12-3 are constructed into a like structure as the distance sensor, and are mounted to each corner of the main body 1 in a manner to face slantingly downwardly.

Rollers 11 serve as travelling devices for moving the main body 1. The rollers are mounted to both right and left sides of the main body 1, and are driven independently by right drive motor 3 and left drive motor 4. Each of the drive motors comprises a geared motor having a built-in reduction gear (not show in the FIG 1.).

Panel switch 14 mounted to an upper surface of the main body 1 has a function of displaying characters and the like, as well as a function of turning the cleaner on and off when the panel switch is touched. First indicators 18 display a state of detection made by the distance sensors and the level sensors. The indicators consist of light emitting diodes, and each is mounted above every one of the level sensors mounted to the corners of the main body 1 of the cleaner. Second indicator 13 displays operating conditions of the electric blower 7, the drive motors and the like, as well as a state when the main body 1 stops operation, and it is mounted to an upper surface of the main body 1. The second indicator 13 consist of light emitting diodes or display panels like liquid-crystal panels.

The panel switch 14 and the indicator 13 are connected with a controller, and they are so constructed that the controller controls operation of the electric blower 7, the drive motors and the like when the user touches the panel switch 14, to move the cleaner automatically with the rollers 11 driven by the drive motors while suctioning dust by the electric blower 7, and the controller stops at least the drive motors 3,4 when the user touches a certain part of the panel switch 14 in case of emergency during automatic travelling. Reference numeral 15 represents a power supply switch. The controller consists of microcomputers having travel control devices 6 for controlling the drive motors 3 and 4.

The main body 1 houses therein the intake opening 9, electric blower 7, dust receiver 10, battery 8 serving as the power supply source, right drive motor 3, left drive motor 4, distance sensors 2-1, 2-2, 2-3, 2-4, level sensors 12-1, 12-2, 12-3, and the like, and the main body is covered by transparent enclosure 16. The distance sensors and the level sensors thus transmit and receive light (i.e. infrared rays) through the enclosure 16. The level sensors transmit and receive the light (infrared rays) through protruding portions 17 where parts of the enclosure 16 are protruded, since the level sensors are mounted to these corners of the main body 1 in a manner to face slantingly downwardly 14. The enclosure 16 may be constructed so as to be semi-transparent. This ensures reliable operation of the distance sensors for detecting a distance by transmitting and receiving the light (infrared rays), and allows the self-moving cleaner to get around an obstacle and the like while travelling, so as to improve travelling performance and to provide the self-moving cleaner with the enclosure of simple structure while reducing cost at the same time. The distance sensors or the level sensors may detect heat sources, and these results may be displayed on the second indicator 13. This advises the user to remove obstacles, for instance children or pets, which they detect at a commencement of automatic travelling.

Figure 2:
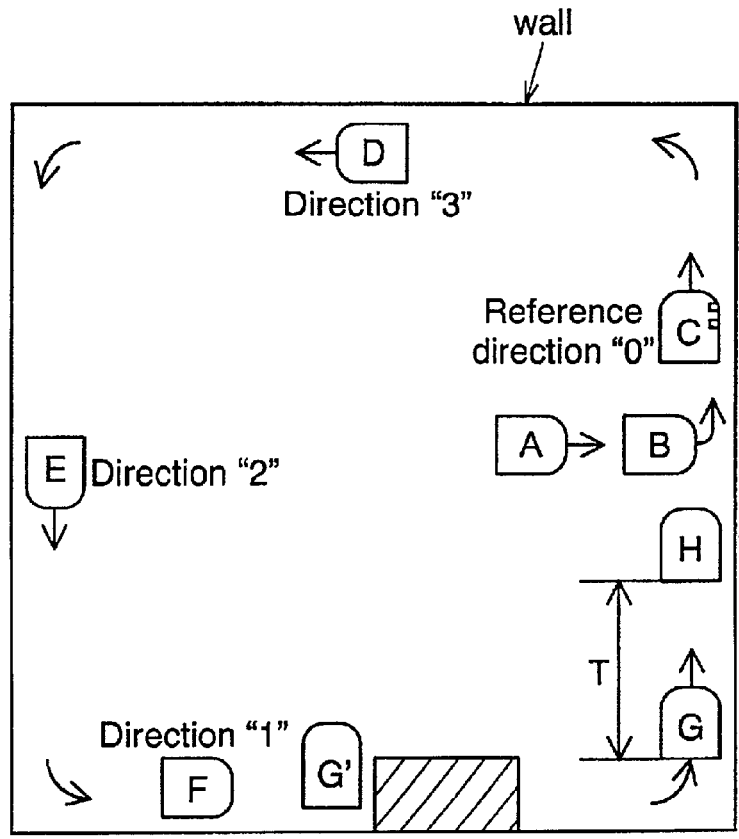
FIG. 2 is a plan view of a room depicting a travelling path alongside walls.
Figure 3:
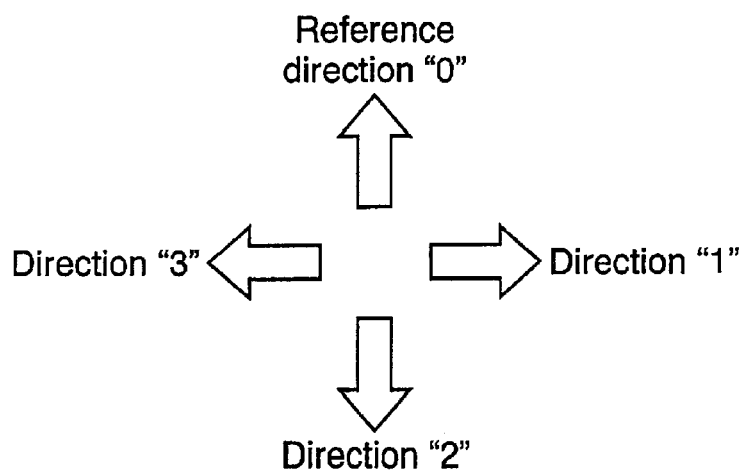
FIG. 3 is a diagram designating moving directions.
Figure 4:
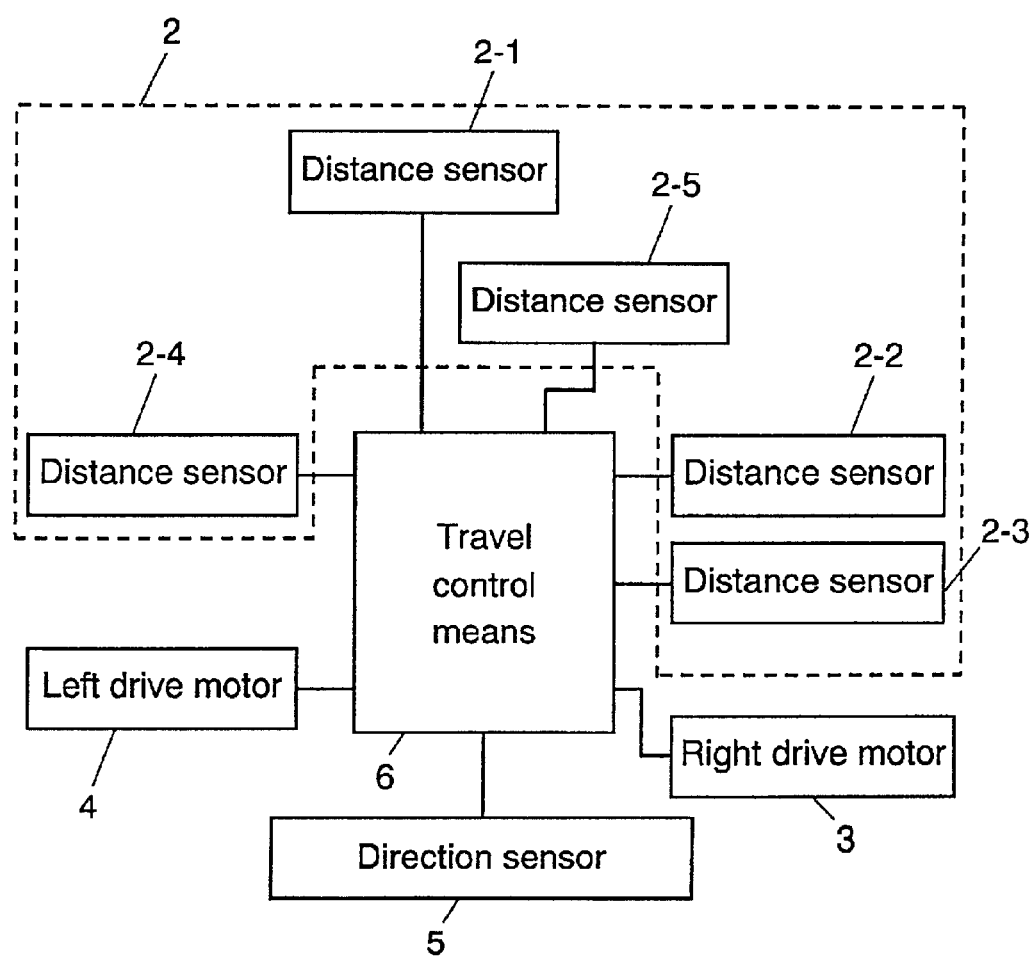
FIG. 4 is a block diagram of a controller.

A travelling operation is now described referring to FIG. 2 through FIG. 4.

In FIG. 2, the cleaner starts to travel at point A. The cleaner moves to turn the main body 1 when it detects an obstacle at point B with distance sensor 2-1 mounted to a forward section of the main body. While the cleaner travels along the obstacle using distance sensors 2-2 and 2-3 mounted to its one side, it determines that a parallel orientation is established at a point when outputs of the distance sensors 2-2 and 2-3 are generally in an equal condition. Assuming that the main body 1 takes an orientation in parallel with a wall at point C, a heading direction at this point is designated as a reference direction, in which the main body 1 travels, in direction sensor 5 for detecting a moving direction of the main body 1. Directions to be determined are designated as reference direction "0", direction "1", direction "2" and direction "3" at approximately every 90° in a clockwise order, as shown in FIG. 3. As the cleaner travels along the wall thereafter, the direction sensor 5 determines that the cleaner has completed a full round along walls of a room when it has traveled for a predetermined time "T" from point G to point H, after the direction sensor 5 detects the reference direction "0". Although the cleaner takes an orientation of the reference direction "0" when there is an obstacle shown by slanted lines, the direction sensor 5 does not make detection of a complete round, since the cleaner has not as yet traveled for the predetermined time "T". This has an advantage of not requiring special manner of detection for completing a full round along the walls of the room. The direction sensor 5 comprises an angular velocity sensor using a gas flow method, vibrating method, optical method or the like.

In addition, the cleaner is provided with a battery capacity detection device for detecting a capacity of the battery 8 which provides power supply to the electric blower 7 and drive motors 3 and 4. The battery capacity detection devices turns off the electric blower 7 for suctioning dust from the floor surface, moves the cleaner along the walls up to a predetermined location and stops the cleaner, when capacity of the battery 8 is reduced. Accordingly, this allows the self-moving cleaner to not stay in an unexpected place to obstruct traffic.

Figure 5:
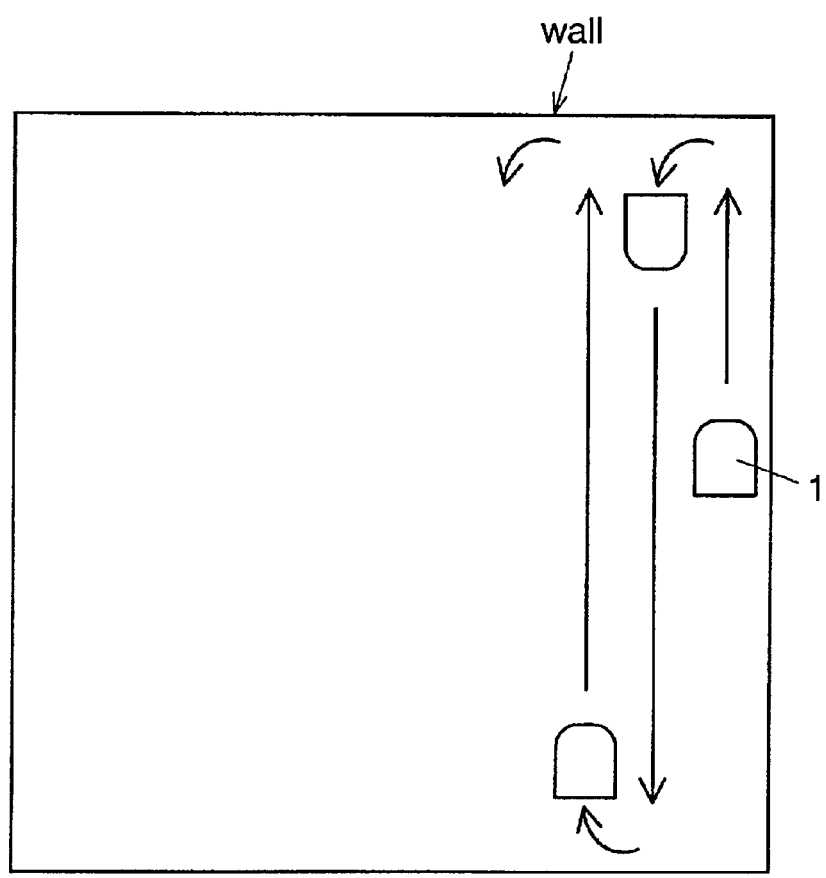
FIG. 5 is a plan view of a room depicting a travelling path inside thereof according to a second exemplary embodiment of the invention.

Described next is a second exemplary embodiment of this invention referring to FIG. 2 and FIG. 5. Like reference numerals are used to designate like structural components as those of the first exemplary embodiment, and their details are omitted. The cleaner of the second embodiment first travels alongside walls. The cleaner then travels in an inner area of a room while moving back and forth in a predetermined direction and another direction opposite the predetermined direction by using direction sensor 5, after determination that the cleaner has completed a full round along the walls of the room. The cleaner can travel and clean dust throughout the room, as it collects the dust in corners of the room while travelling alongside of the walls, and suctions the dust inside of the room while travelling in the inner area with guide of the direction sensor 5.

A third exemplary embodiment of this invention is described next with reference to FIG. 6 and FIG. 7. Again, like reference numerals are used to designate like structural components as those of the first exemplary embodiment, and their details are omitted. The cleaner of the third embodiment first travels alongside walls of a room, and thereafter it travels in an inner area as guided by direction sensor 5. The cleaner again travels alongside the walls, moves toward the inner area of room at point "H" after determination that it has completed a full round along the walls of the room, and turns off electric blower 7 and drive motors 3 and 4 to stop travel at point "I". There is a case that a door cannot be opened as main body 1 obstructs opening and closing of the door, if the main body 1 stops travelling near a wall as shown in FIG. 7 where there is the door that opens inside the room. A problem of this kind is avoided, however, by causing the main body 1 to stop travelling only after it has moved to the inner area of the room.

Figure 6:
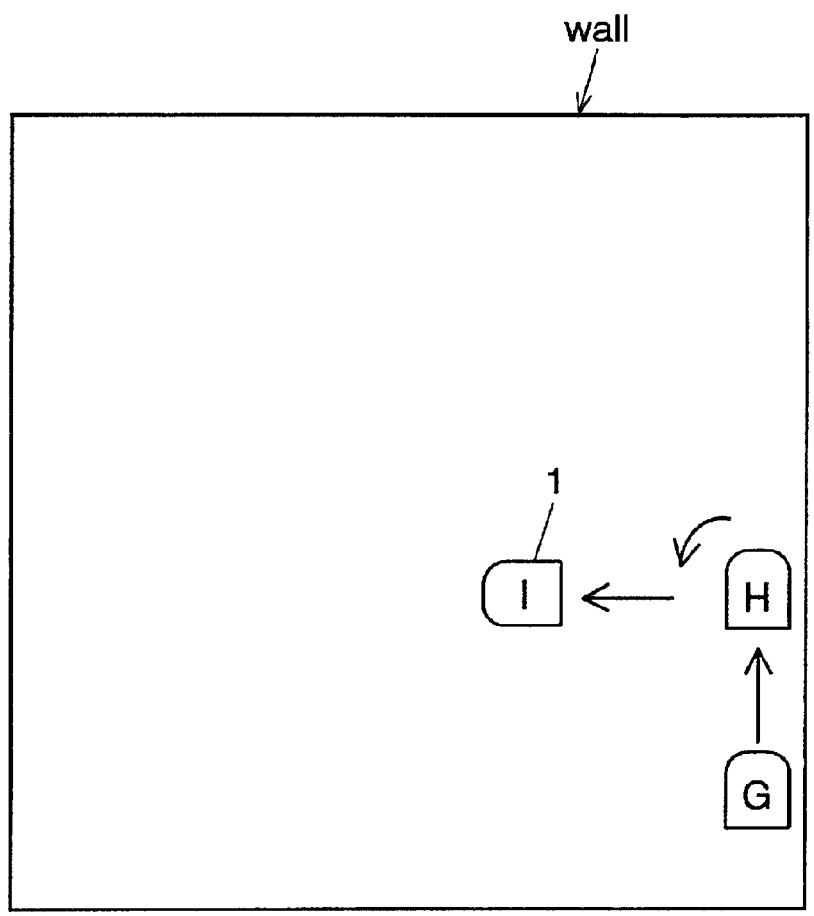
FIG. 6 is another plan view of the room depicting a travelling path according to a third exemplary embodiment of the invention, after the cleaner has detected as having completed a full round.
Figure 7:
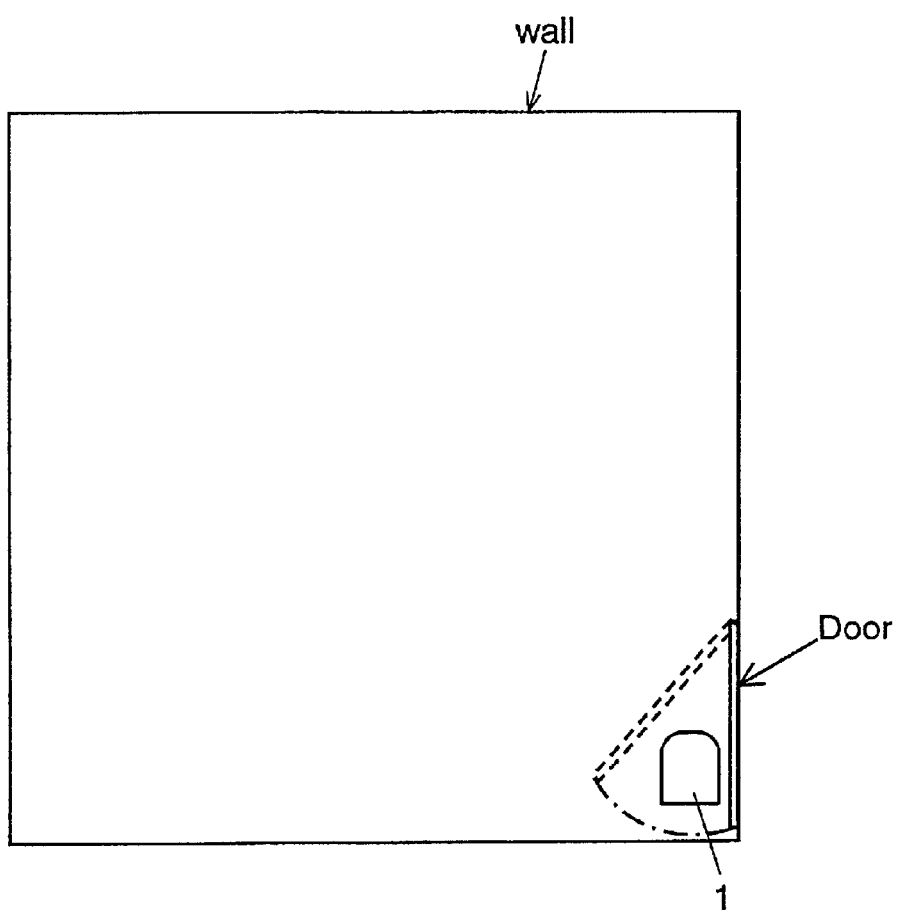
FIG. 7 is another plan view of the room as the cleaner is standing in a corner thereof.

In FIG. 6, the cleaner first travels alongside of the walls, travels the inner area thereafter as guided by the direction sensor 5, again travels alongside of the walls, moves toward the inner area of the room at point "H" after determination that it has completed a full round along the walls of the room, and turns off the electric blower 7, the drive motors 3 and 4, to stop travelling at point "I" where distance sensor 2-5 mounted to an upper section of the main body 1, does not detect any obstacle above the main body. If the main body 1 travel beneath a bed or a desk, for instance, and stops moving, it gives rise to a problem, because the main body 1 hides itself under the bed or the desk, which requires a user to locate the cleaner when he/she is to use it again. However, the above problem can be resolved by allowing the cleaner to move only to an area where there is no obstacle above the cleaner when it stops travelling.

Furthermore, in FIG. 6, the cleaner first travels alongside the walls, travels in the inner area thereafter as guided by the direction sensor 5, again travels alongside the walls, moves toward the inner area of the room at point "H" after determination that it has completed a full round along the walls of the room, and turns off the electric blower 7, the drive motors 3 and 4, to stop traveling at point "I" where distance sensor 2-5 mounted to an upper section of the main body 1 does not detect any obstacle above the main body. At this moment, the cleaner turns itself by 360° to determine if there is any obstacle around it, and stops operation only when it finds no obstacle. There is a case that a door cannot be opened if the main body 1 obstructs opening and closing of the door, if the cleaner stops travelling near a wall where there is the door that opens inside the room, as shown in FIG. 7. A problem as described here can be avoided by causing the main body 1 turn 360° to detect presence or absence of any obstacle around it, and stop operation only when there is no obstacle, when the main body 1 moves toward the inner area of the room and stops travelling.

Figure 8:
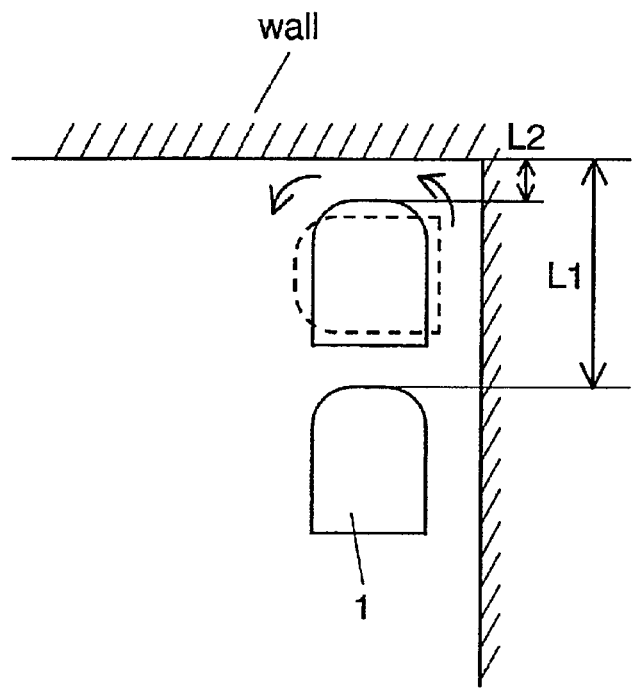
FIG. 8 is a plan view of the room, which pertains to a fourth exemplary embodiment of the invention.

Referring to FIG. 8, a fourth exemplary embodiment of the invention is described next. Like reference numerals are used to designate like structural components as those of the first exemplary embodiment, and their details are omitted. When the cleaner of the fourth embodiment travels alongside walls by controlling right drive motor 3 and left drive motor 4 using an output of distance sensor 2-2 mounted to its right side, rotational speeds of the right drive motor 3 and the left drive motor 4 are reduced in a manner to decelerate the travelling speed, when a distance to a detected wall obtained from an output of distance sensor 2-1 mounted to the forward section of the main body is smaller than the first prescribed value L1. In addition, the right drive motor 3 is controlled to be driven into forward rotation and the left drive motor 4 is controlled to be driven into reverse rotation in a manner to make a counterclockwise turn, when a distance to the detected wall obtained from subsequent output of the distance sensor 2-1 becomes smaller than second prescribed value L2, which is smaller than the first prescribed value L1. This is a case when the cleaner makes a turn inside a corner. The cleaner can turn smoothly in the corner without hitting a wall, when the travelling speed is reduced in advance to prevent the cleaner from hitting a wall in front of it, and by presetting the second prescribed value L2, used for comparison with the output of the distance sensor 2-1 mounted to the forward section of the main body 1, to such a value as to eliminate a chance of the main body hitting the wall in front of it during its turning movement.

Figure 9:
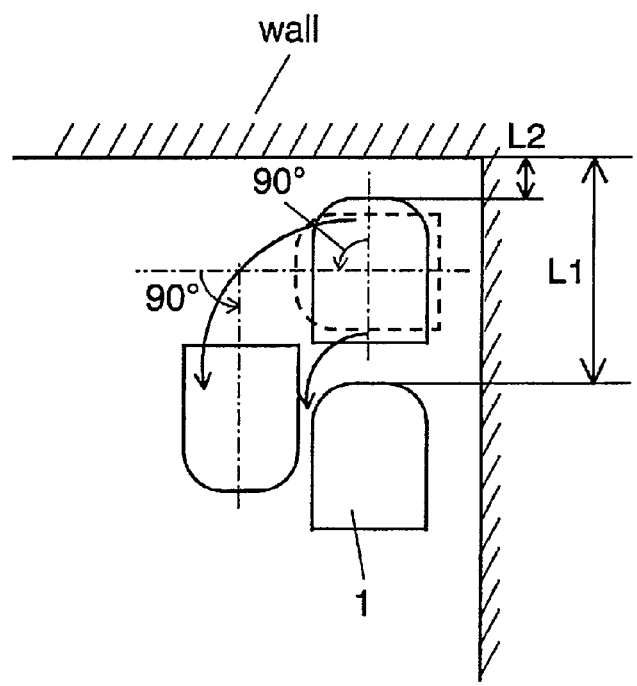
FIG. 9 is another plan view of the room, which pertains to a fifth exemplary embodiment of the invention.

Next, a fifth exemplary embodiment of the invention is described referring to FIG. 9. Again, like reference numerals are used to designate like structural components as those of the first exemplary embodiment, and their details are omitted. When the cleaner of the fifth embodiment travels alongside walls by controlling right drive motor 3 and left drive motor 4 using an output of distance sensor 2-2 mounted to its right side, rotational speeds of the right drive motor 3 and the left drive motor 4 are reduced in a manner to decelerate a travelling speed, when an output of distance sensor 2-1 mounted to the forward section of the main body represents a value nearer than first prescribed value L1. In addition, the right drive motor 3 is controlled to be driven into forward rotation and the left drive motor 4 is controlled to be driven into reverse rotation while maintaining their speeds equal, in a manner that the cleaner turns counterclockwise by approximately 90° when a subsequent output of the distance sensor 2-1 shows a value smaller than second prescribed value L2. In other words, the cleaner in this position makes a turn of approximately 90° about a center of an axis at a mid point between the right drive motor 3 and the left drive 4. Upon completion of the approximately 90° turn, the cleaner further makes another turn 90° by having both the right drive motor 3 and the left drive motor 4 driven into forward rotation with the left drive motor 4 rotated slower than the right drive motor 3. When the cleaner is turned by approximately 180° in this manner, it is situated adjoining a track it has traveled on its way, but in a direction opposite thereto. The cleaner travels thereafter again in the opposite direction according to an output of the direction sensor 5.

In making the second turn approximately 90° here (i.e., both the right drive motor 3 and the left drive motor 4 make forward rotation, with a speed of the left drive motor 4 reduced relative to that of the right motor 3), there can be reduced to a great extent a possible area where the cleaner fails to sweep through during forward and backward passages, when it is turned slightly more than 90°, and thereafter moved in the opposite direction according to an output of the direction sensor 5.

Furthermore, with regard to a relationship between a travelling speed of the cleaner when it travels alongside the walls by being controlled with an output of the distance sensor 2 mounted to the side of the main body and another travelling speed when the cleaner travels in a predetermined direction within an inner area of a room according to the direction sensor 5, the former is set slower than the latter. This decreases a frequency of the cleaner to collide with the walls since it is closer to these obstacles when travelling along the walls, and reduces a chance of damaging the walls and the like. In addition, this cleaner also has an advantageous effect of cleaning slowly and thoroughly entire areas near the walls where dust has usually collected.

Figure 10:
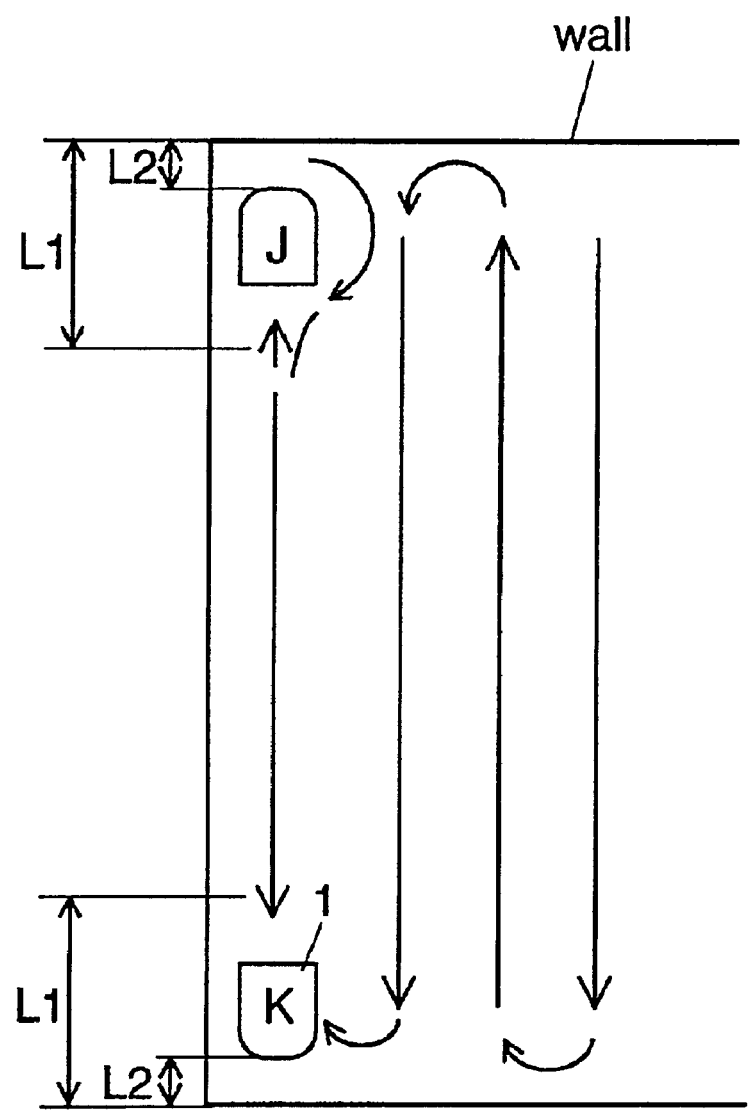
FIG. 10 is still another plan view of the room, which pertains to a sixth exemplary embodiment of the invention.

A sixth exemplary embodiment of the invention is described now with reference to FIG. 10. Like reference numerals are used throughout to designate like structural components as those of the first exemplary embodiment, and their details are omitted. At first, the cleaner of the sixth embodiment travels the same as that of the second exemplary embodiment. When the cleaner detects an obstacle at point J with distance sensor 2-4 mounted to its left side, it turns approximately 180° to face in an opposite direction, and continues thereafter to travel back in the opposite direction according to an output of direction sensor 5. The self-moving cleaner provided here stops its operation when it detects an obstacle at point K with distance sensor 2-3 mounted to its right side, where it determines that the obstacle is a wall of a room and that the cleaner has traveled throughout an interior of the room according to its function of travelling through the room with guide of the direction sensor 5.

Figure 11:
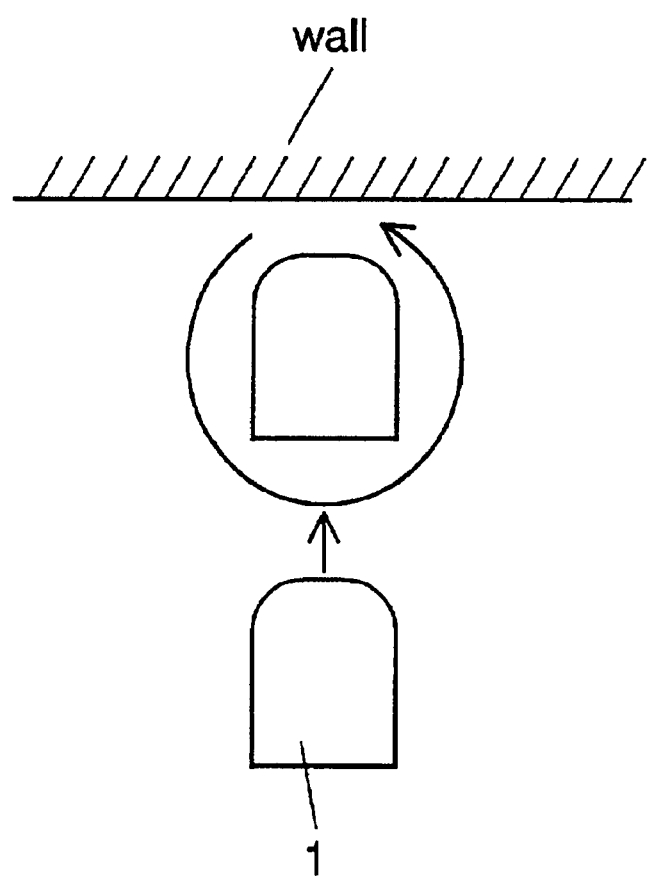
FIG. 11 is yet another plan view of the room, which pertains to a seventh exemplary embodiment of the invention.

A seventh exemplary embodiment of the invention is described now with reference to FIG. 11. Like reference numerals are used throughout to designate like structural components as those of the first exemplary embodiment, and their details are omitted. When the cleaner of the seventh embodiment starts travelling and detects an obstacle with distance sensor 2-1 mounted to the forward section of the main body 1, the cleaner moves in a manner to turn main body 1 by 360°, and it diagnoses itself for any abnormality by examining outputs of the distance sensors mounted to a periphery of the main body 1 using a facing wall. There is thus provided a self-moving cleaner which can find malfunction of the distance sensors, and improves safety by not starting itself into a moving operation if it finds a failure in any of the distance sensors.

What is claimed is:

1. A self-moving cleaner comprising:
   a main body;
   an intake opening for suctioning therethrough dust collected on a surface to be cleaned;

an electric blower for generating airflow to suction the dust;

a dust receiver for collecting the dust suctioned through said intake opening;

a drive motor;

a roller to be driven by said drive motor;

a power source for supplying electric power to said electric blower and said drive motor;

a sensor for optically detecting a distance to an obstacle; and an enclosure containing therein said electric blower, said dust receiver, said power source, and said sensor, wherein said enclosure is entirely transparent or entirely semi-transparent such that said sensor can transmit and receive light through said enclosure.

2. The self-moving cleaner according to claim 1, further comprising:
an indicator for displaying at least one of
(i) a state of detection of said sensor, and
(ii) an operating condition of at least one of said electric blower and said drive motor.

3. The self-moving cleaner according to claim 2, wherein said indicator comprises a first indicator for displaying the state of detection of said sensors, and a second indicator for displaying the operating condition of said at least one of said electric blower and said drive motor.

4. The self-moving cleaner according to claim 1, wherein said sensor is mounted to a corner of said main body as viewed from above said main body.

5. The self-moving cleaner according to claim 1, wherein said sensor is mounted to a forward section of said main body.

6. The self-moving cleaner according to claim 5, further comprising:
a direction sensor for detecting a moving direction of said main body;
another plurality of sensors mounted to a side of said main body for optically detecting a distance to an obstacle; and
a travel control device for controlling said roller according to an output of said direction sensor, said sensor mounted to the forward section of said main body, and said another plurality of sensors mounted to the side of said main body, such that
(i) said main body turns and travels alongside a wall a room when said sensor mounted to the forward section of said main body detects the wall,
(ii) designated as a reference direction is a direction of movement of said main body at a time when outputs of said another plurality of sensors mounted to the side of said main body are generally in agreement, and set as a reference for output of said direction sensor is the direction of movement of said main body, and
(iii) determined is that said main body has completed a full round alongside walls of the room, when said main body has traveled for a predetermined time after said direction sensor has detected the moving direction of said main body as being the reference direction.

7. The self-moving cleaner according to claim 6, wherein said travel control device is for controlling said roller such that (iv) said main body travels in a predetermined direction in the room according to an output of said direction sensor after determination that said main body has completed a full round along the walls of the room,
(v) said main body turns and travels in a second direction when said sensor mounted to the forward section of said main body detects an obstacle, and
(vi) said main body again turns when said sensor mounted to the forward section of said main body detects another obstacle, and then travels back and forth in said predetermined direction and said second direction.

8. The self-moving cleaner according to claim 6, wherein said travel control device is for controlling said roller such that
(iv) said main body travels in a predetermined direction in the room according to an output of said direction sensor,
(v) said main body turns and travels in a second direction when said sensor mounted to the forward section of said main body detects an obstacle,
(vi) said main body again turns when said sensor mounted to the forward section of said main body detects a wall, and then travels back and forth in said predetermined direction and said second direction,
(vii) upon completion of (iv)–(vi), said main body travels again alongside the walls of the room, and
(viii) said main body moves toward an inner area of the room, and supply of electric power to said drive motor is terminated after determination that said main body has completed a full round along the walls of the room.

9. A self-moving cleaner comprising:
a main body;
a moving device for moving said main body;
a direction sensor for detecting a moving direction of said main body;
distance sensors disposed at a forward section and a side of said main body for measuring a distance to an obstacle around said main body;
a battery defining a power source;
a travel control device for controlling said moving device according to an output of said direction sensor and any of said distance sensors such that
(i) said main body turns and travels alongside a wall of a room when any of said distance sensors disposed at the forward section of said main body detects the wall,
(ii) designated as a reference direction is a direction of movement of said main body at a time when outputs of said distance sensors disposed at the side of said main body are generally in agreement, and set as a reference for output of said direction sensor is the direction of movement of said main body, and
(iii) determined is that said main body has completed a full round alongside walls of the room, when said main body has traveled for a predetermined time after said direction sensor has detected the moving direction of said main body as being the reference direction; and
an enclosure containing therein said distance sensors, said travel control device and said battery, with said enclosure being entirely transparent or entirely semi-transparent.

* * * * *

UNITED STATES PATENT AND TRADEMARK OFFICE
CERTIFICATE OF CORRECTION

PATENT NO. : 6,901,624 B2 Page 1 of 1
DATED : June 7, 2005
INVENTOR(S) : Hiroshi Mori et al.

It is certified that error appears in the above-identified patent and that said Letters Patent is hereby corrected as shown below:

<u>Column 7,</u>
Line 45, insert -- of -- after "wall".

Signed and Sealed this

Thirtieth Day of August, 2005

JON W. DUDAS
*Director of the United States Patent and Trademark Office*